United States Patent [19]

Kim

[11] Patent Number: 5,502,507
[45] Date of Patent: Mar. 26, 1996

[54] EQUALIZATION APPARATUS WITH FAST COEFFICIENT UPDATING OPERATION

[75] Inventor: Young-Sang Kim, Seoul, Rep. of Korea

[73] Assignee: Daewoo Electronics Co., Ltd., Seoul, Rep. of Korea

[21] Appl. No.: 373,153

[22] Filed: Jan. 17, 1995

[30] Foreign Application Priority Data

Jan. 18, 1994 [KR] Rep. of Korea .................. 94-756

[51] Int. Cl.$^6$ ..................................... H04N 5/21
[52] U.S. Cl. ................... 348/607; 348/725; 364/724.2; 375/232
[58] Field of Search ..................... 348/607, 611, 348/614, 725; 375/232, 233, 350; 364/724.16, 724.17, 724.20; H04N 5/21

[56] References Cited

U.S. PATENT DOCUMENTS

| | | | |
|---|---|---|---|
| 3,868,603 | 2/1975 | Guidoux | 333/18 |
| 4,483,009 | 11/1984 | Howda et al. | 375/14 |
| 4,715,001 | 12/1987 | Deem et al. | 348/735 |
| 5,027,369 | 6/1991 | Kuenast | 375/14 |
| 5,237,416 | 8/1993 | Ito et al. | 348/614 |
| 5,293,234 | 3/1994 | Ko | 348/614 |

FOREIGN PATENT DOCUMENTS 0239153  9/1987  European Pat. Off. ........ H04L 25/03

OTHER PUBLICATIONS

R. A. Pelso, "Adaptive Equalization for Advanced Television", IEEE Transactions on Consumer Electronics, vol. 38, No. 3, pp. 119–126 (Aug., 1992).

T. Liu et al., "Simulation and Implementation of US QAM-based HDTV Channel Decoder", IEEE Transactions on Consumer Electronics, vol. 39, No. 3, pp. 676–682 (Aug., 1993).

Y. S. Choi et al., "Adaptive Blind Equalization Coupled with Carrier Recovery for HDTV Modem", IEEE Transactions on Consumer Electronics, vol. 39, No. 3, pp. 386–391 (Aug., 1993).

M. Obara et al., "A Digital Time Domain Equalizer for Teletext", IEEE Transactions on Consumer Electronics, vol. 28, No. 3, pp. 447–452, (Aug. 1982).

Primary Examiner—James J. Groody
Assistant Examiner—Jeffrey S. Murrell
Attorney, Agent, or Firm—Anderson Kill Olick & Oshinsky

[57] ABSTRACT

An improved equalization apparatus includes a coefficient update module for receiving a filtered signal from the equalizer filter circuit and for generating a set of filter coefficients including a set of coarsely updated coefficients or a set of finely updated coefficients for equalizer filter. The coefficient updating module includes a first memory means for storing a set of coarse error values, and for generating, in response to a filtered data sample, a first error signal representative of the corresponding coarse error value; and a second memory for storing a set of fine error values, and for generating, in response to a filtered data sample and a control signal, a second error signal representative of the corresponding fine error value.

2 Claims, 1 Drawing Sheet

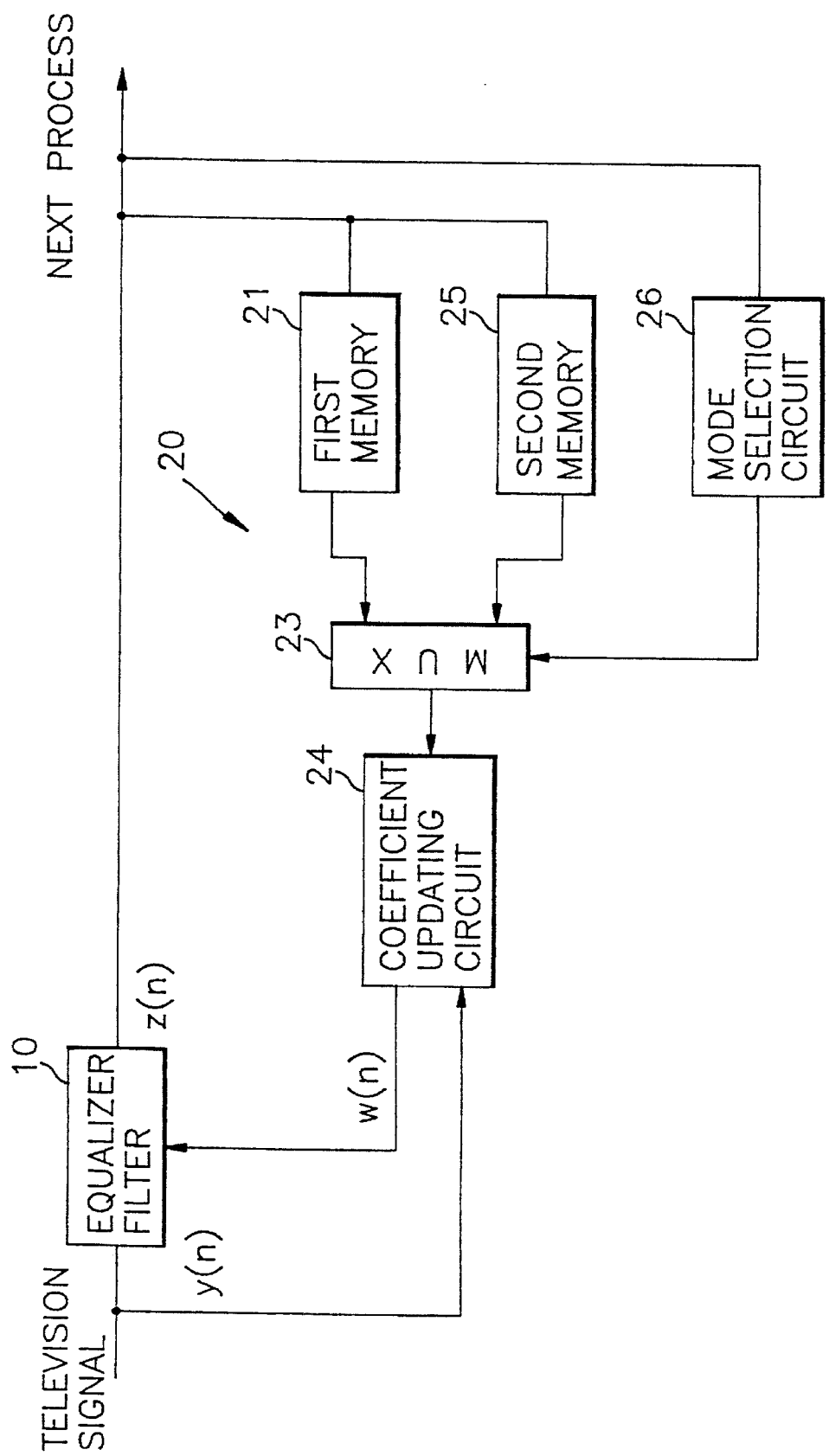

EQUALIZATION APPARATUS WITH FAST COEFFICIENT UPDATING OPERATION

FIELD OF THE INVENTION

The invention relates to an equalization apparatus for use in a high definition television (HDTV) signal receiving system; and, more particularly, to an improved equalization apparatus which is capable of providing a speedy coefficient updating operation.

DESCRIPTION OF THE PRIOR ART

In a HDTV system, television signals from a television signal transmission source are transmitted over a transmission channel such as radio channel to a HDTV signal receiving end. One of the inherent problems associated with the transmission of television signals over the transmission channel is that channel distortions and additive noises tend to disrupt, e.g., data symbols contained in the transmitted television signal, thereby adversely affecting the ability of the HDTV signal receiving system to distinguish the received symbol levels. To ameliorate this problem, a typical HDTV signal receiving system includes a channel adaptive equalizer.

Such a prior art channel adaptive equalizer employs a filtering device that removes from a received signal the amplitude and phase distortions resulting from, e.g., a frequency dependent time-variant response of the transmission channel, to thereby provide an improved symbol decision capability. Specifically, the channel adaptive equalizer emulates the transfer function of the transmission channel and applies the inverse of the transfer function to the received signal so as to rectify the distortion effects.

One of such equalization apparatus for use in a HDTV signal receiving system is disclosed in an article by Samir N. Hulyalkar et al., "Advanced Digital HDTV Transmission System for Terrestrial Video Simulcasting", *IEEE Journal on Selected Areas in Communications*, 11, No. 1, pp 119–125 (January, 1993), which includes a finite impulse response (FIR) filter having a plurality of equalizer coefficients called tap coefficients and a coefficient updating module to provide a self-adjustment without the need to use a training sequence. The coefficient updating module is operated in two steps: a blind mode; and a decision directed mode. In the blind mode, the filter coefficients are coarsely adjusted up to their initial values, in response to a coarse error signal which is calculated by employing a known nonlinear function. In the decision directed mode, the filter coefficients are finely updated up to their optimum values by using a decision error signal which is calculated by using a known decision function.

However, since the error signals used in the updating operation are iteratively calculated by using a conventional processing device, such equalization apparatus requires a substantial amount of calculation time to obtain the error signals, resulting in a delay in its coefficient updating operation.

SUMMARY OF THE INVENTION

It is, therefore, a primary object of the invention to provide an improved equalization apparatus which is capable of providing a high speed updating operation.

In accordance with the invention, there is provided an equalization apparatus for use in a television signal receiving system, which comprises:

an equalizer filter having a set of filter coefficients for equalizing a received television signal distorted from an original signal having a plurality of original data samples in a transmission channel to produce a filtered signal, wherein the received television signal includes a plurality of data samples and the filtered signal includes a corresponding plurality of filtered data samples;

first memory means for storing a set of coarse error values, each of the coarse error values representing the difference between a predicted filtered data sample and a predetermined value, and for generating, in response to a filtered data sample corresponding to said predicted filtered data sample, a first error signal representative of the corresponding coarse error value;

second memory means for storing a set of fine error values, each of the fine error values representing the difference between a predicted filtered data sample and a corresponding original data sample, and for generating, in response to a filtered data sample corresponding to said predicted filtered data sample and a control signal, a second error signal representative of the corresponding fine error value;

updating means for generating, in response to the received television signal and the first error signal, a set of coarsely updated filter coefficients as the set of filter coefficients for the equalizer filter, and for generating, in response to the received television signal and the second error signal, a set of finely updated filter coefficients as the set of filter coefficients for the equalizer filter; and control means for generating the control signal when the mean square error of the filtered signal is identical to or smaller than a predetermined threshold value, to thereby couple the second error signal to the updating means.

BRIEF DESCRIPTION OF THE DRAWING

The above and other objects and features of the present invention will become apparent from the following description of preferred embodiments given in conjunction with the accompanying drawing, which is a schematic block diagram of a television signal equalization apparatus in accordance with the present invention.

DETAILED DESCRIPTION OF THE PREFERRED EMBODIMENTS

Referring to the drawing, there is shown an equalization apparatus in accordance with the present invention. The equalization apparatus includes an equalizer filter circuit 10 having a set of filter coefficients, and a coefficient update module 20 for updating the set of filter coefficients.

A received television signal is sampled by a known sampling circuit into a plurality of data samples which are sequentially coupled to the equalizer filter circuit 10 and the coefficient update module 20. The equalizer filter circuit 10 is comprised of a finite impulse response (FIR) filter wherein the received television signal from the transmission channel is filtered and equalized by using the set of filter coefficients contained therein in order to produce a filtered signal. The filtered signal includes a corresponding plurality of filtered data samples which are sequentially coupled to the coefficient update module 20 and to a next processor, e.g., a decoder(not shown).

That is, the received television signal y(n) is coupled to the equalization apparatus and is filtered by the equalizer filter 10 to correct the received television signal y(n) distorted in a transmission channel(not shown) and produce the filtered signal as an equalized television signal that approximates the original non-distorted television signal prior to its transmission.

As is known, the filtered signal z(n) from the equalizer filter circuit 10 may be represented as follows:

$$z(n) = \sum_{i=0}^{M-1} w_i y(n-i) \quad (1)$$

wherein $w_i$ is a vector or set of filter coefficients for the equalizer filter; and M is a positive integer representing the number of the filter cells.

The filter coefficients w(n) are iteratively updated by the coefficient updating circuit 20 until an equalized television signal is obtained; and may be represented as follows:

$$w(n+1)=w(n)+\mu y(n)e(n) \quad (2)$$

wherein $\mu$ is a small number, e.g., $2^{-10}$ and e(n) is an error signal. Therefore, the coefficient update module 20 operates to converge toward an optimum set of filter coefficients W(n) in order for the equalizer filter 10 to produce the filtered signal z(n) as the equalized television signal which approximates the original television signal.

As shown, the coefficient update module 20 is operated in two steps, i.e., a blind mode and a decision directed mode; and includes a first memory 21, a multiplexer 23, a coefficient updating circuit 24, a second memory 25 and a mode selection circuit 26. In the blind mode, the first memory 21, in response to the filtered data sample from the equalizer filter circuit 20, generates a first error signal which is coupled via the multiplexer 23 to the coefficient updating circuit 24.

A coarse error value representing the difference between a predicted filtered data sample and a predetermined fixed value is calculated and stored in the first memory 21, wherein a mean value of the original non-distorted data samples is preferably selected as the predetermined fixed value. In this manner, all of the coarse error values corresponding to all of the predicted filtered data samples are calculated and stored in the first memory 21 as a lookup table. In this case, assuming that a predicted filtered data sample is represented by T bits, the number of all of the combinable predicted filtered data samples and, hence, the required size of the memory is of $2^T$, wherein T is a positive integer In accordance with the present invention, the first memory 21 is implemented by using a electrically erasable programmable read only memory (EEPROM).

As described above, the first memory 21 in response to a filtered data sample corresponding to a predicted filtered data sample, serves to generate a first error signal representative of the corresponding coarse error value.

The coefficient updating circuit 24 receives the first error signal and the data sample corresponding to the filtered data sample in order to generate coarsely updated coefficients, for providing an initial convergence, which are coupled to the equalizer filter 10. The coarsely updated coefficients for providing the initial convergence supersede the previous set of filter coefficients maintained within the equalizer filter 20.

On the other hand, in the decision directed mode, the second memory 25 receives the filtered data samples to generate a second error signal which is coupled via the multiplexer 23 to the coefficient updating circuit 24.

A fine error value representing the difference between a predicted filtered data samples and a corresponding original non-distorted data sample is calculated and stored in the second memory 25. In this manner, all of the fine error values corresponding to the predicted filtered data samples are calculated and stored in the second memory 25 as a lookup table. The second memory 25 is also implemented by using a electrically erasable programmable read only memory (EEPROM).

As described above, the second memory 25 is responsive to a filtered data sample corresponding to a predicted filtered data sample and generates a second error signal representative of the corresponding fine error value.

The coefficient updating circuit 24 receives the second error signal and the data sample corresponding to the filtered data sample to generate a set of finely updated coefficients in order to achieve an optimum convergence of the filter coefficients. The finely updated coefficients are coupled to the equalizer filter 10 to supersede the previous filter coefficients maintained within the equalizer filter 10.

The mode change operation is controlled by using a mode selection circuit 26 for generating two mode selection signals: a blind mode signal and a decision directed mode signal. That is, the mode selection circuit 26 receives the filtered signal in order to evaluate a mean square error (MSE) thereof. The MSE is compared with a predetermined threshold value which can be experimentally determined on the basis of so-termed eye pattern. When the MSE is greater than the predetermined error value, the mode selection circuit 26 generates a blind mode signal which serves to actuate the multiplexer 23 in order to couple the first error signal outputted from the first memory 21 as the error signal via the multiplexer 23 to the coefficient updating circuit 24.

On the other hand, if the MSE is identical to or smaller than the predetermined error value, the mode selection circuit 26 produces a decision directed mode signal which serves to operate the multiplexer 23 to couple the second error signal outputted from the second memory 25 as the error signal via the multiplexer 23 to the coefficient updating circuit 24.

As may be seen from the above, the first and the second error signals are pre-calculated and stored in the first and the second memories, respectively, to be accessed by the filtered data samples. As a result, the error signals can be obtained with a greatly reduced delay time to thereby achieve a speedy coefficient updating operation of the equalization apparatus.

While the present invention has been described with respect to certain preferred embodiments only, other modifications and variations may be made without departing from the spirit and scope of the present invention as set forth in the following claims.

What is claimed is:

1. An equalization apparatus for use in a television signal receiving system, which comprises:

an equalizer filter having a set of filter coefficients for equalizing a received television signal distorted from an original signal having a plurality of original data samples in a transmission channel to produce a filtered signal, wherein the received television signal includes a plurality of data 10 samples and the filtered signal includes a corresponding plurality of filtered data samples;

first memory means for storing a set of coarse error values, each of the coarse error values representing the difference between a predicted filtered data sample and a predetermined value, and for generating, in response to a filtered data sample corresponding to said predicted filtered data sample, a first error signal representative of the corresponding coarse error value;

second memory means for storing a set of fine error values, each of the fine error values representing the difference between a predicted filtered data sample and a corresponding original data sample, and for generating, in response to a filtered data sample corresponding to said predicted filtered data sample and a control signal, a second error signal representative of the corresponding fine error value;

updating means for generating, in response to the received television signal and the first error signal, a set of coarsely updated filter coefficients as the set of filter coefficients for the equalizer filter, and for generating, in response to the received television signal and the second error signal, a set of finely updated filter coefficients as the set of filter coefficients for the equalizer filter; and control means for generating the control signal when the mean square error of the filtered signal is identical to or smaller than a predetermined threshold value, to thereby couple the second error signal to the updating means.

2. The equalization apparatus as recited in claim 1, wherein the first and the second memory means are implemented by using electrically erasable programmable read only memories.

* * * * *